(12) United States Patent
Yasuda et al.

(10) Patent No.: US 9,658,810 B2
(45) Date of Patent: May 23, 2017

(54) IMAGE FORMING APPARATUS, INFORMATION PROCESSING APPARATUS, IMAGE FORMING METHOD, AND NON-TRANSITORY COMPUTER READABLE MEDIUM THAT GENERATE A LIST OF USERS WAITING FOR A JOB EXECUTION

(71) Applicant: FUJI XEROX CO., LTD., Tokyo (JP)

(72) Inventors: Shunichi Yasuda, Kanagawa (JP); Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/925,629

(22) Filed: Oct. 28, 2015

(65) Prior Publication Data

US 2016/0342370 A1   Nov. 24, 2016

(30) Foreign Application Priority Data

May 22, 2015   (JP) .................................. 2015-104363

(51) Int. Cl.
*G06F 3/12* (2006.01)
*H04N 1/00* (2006.01)

(52) U.S. Cl.
CPC ............ *G06F 3/126* (2013.01); *G06F 3/1207* (2013.01); *G06F 3/1286* (2013.01); *G06F 3/1292* (2013.01); *H04N 1/00204* (2013.01); *H04N 1/00307* (2013.01); *H04N 2201/0094* (2013.01)

(58) Field of Classification Search
CPC .. G06F 17/30289; G06F 3/1215; G06F 3/126; G06F 3/1263; G06F 3/1207; G03G 15/5083
USPC ........... 358/1.9, 1.15; 399/87; 707/799, 803, 707/804, 805
See application file for complete search history.

(56) References Cited

U.S. PATENT DOCUMENTS

| | | | | |
|---|---|---|---|---|
| 6,618,167 B1 * | 9/2003 | Shah | ..................... | G06F 3/1205 358/1.13 |
| 2007/0127054 A1 * | 6/2007 | Nishizawa | ............ | G06F 21/608 358/1.14 |
| 2009/0290190 A1 * | 11/2009 | Torii | ..................... | G06F 3/1222 358/1.15 |

FOREIGN PATENT DOCUMENTS

| | | | |
|---|---|---|---|
| JP | H09-290548 | A | 11/1997 |
| JP | 2000-276312 | A | 10/2000 |
| JP | 2004-348401 | A | 12/2004 |
| JP | 3832978 | B2 | 10/2006 |
| JP | 3969025 | B2 | 8/2007 |
| JP | 2008-068441 | A | 3/2008 |
| JP | 4435191 | B2 | 3/2010 |
| JP | 4513271 | B2 | 7/2010 |
| JP | 4646312 | B2 | 3/2011 |

* cited by examiner

*Primary Examiner* — Jamares Q Washington
(74) *Attorney, Agent, or Firm* — Oliff PLC

(57) ABSTRACT

An image forming apparatus includes a generating unit that generates a list of sequence of one or more users who wait for an execution of a job by the image forming apparatus or an operation of the image forming apparatus, and an output unit that outputs information of the list to a terminal apparatus of a user.

12 Claims, 11 Drawing Sheets

| EXECUTION SEQUENCE | JOB ID | USER ID | RESERVATION NO. | RECEPTION TIME | EXPECTED TIME PERIOD FOR EXECUTION | EXPECTED TIME OF COMPLETION | |
|---|---|---|---|---|---|---|---|
| 1 | XXXX | XXXX | 0011 | XX:XX | XX:XX | XX:XX | |
| 2 | XXXX | XXXX | 0012 | XX:XX | XX:XX | XX:XX | |
| 3 | XXXX | XXXX | 0013 | XX:XX | LONGER | XX:XX |  |
| 4 | XXXX | XXXX | 0014 | CLOSER | SHORTER | XX:XX | |

| EXECUTION SEQUENCE | JOB ID | USER ID | RESERVATION NO. | RECEPTION TIME | EXPECTED TIME PERIOD FOR EXECUTION | EXPECTED TIME OF COMPLETION |
|---|---|---|---|---|---|---|
| 1 | XXXX | XXXX | 0011 | XX:XX | XX:XX | XX:XX |
| 2 | XXXX | XXXX | 0012 | XX:XX | XX:XX | XX:XX |
| 3 | XXXX | XXXX | 0013 | XX:XX | XX:XX | XX:XX |
| 4 | XXXX | XXXX | 0014 | XX:XX | XX:XX | XX:XX |

| EXECUTION SEQUENCE | JOB ID | USER ID | RESERVATION NO. | RECEPTION TIME | EXPECTED TIME PERIOD FOR EXECUTION | EXPECTED TIME OF COMPLETION |
|---|---|---|---|---|---|---|
| 1 | XXXX | XXXX | — | XX:XX | XX:XX | XX:XX |
| 2 | XXXX | XXXX | 0011 | XX:XX | XX:XX | XX:XX |
| 3 | XXXX | XXXX | 0012 | XX:XX | XX:XX | XX:XX |
| 4 | XXXX | XXXX | 0013 | XX:XX | XX:XX | XX:XX | ian
IMAGE FORMING APPARATUS, INFORMATION PROCESSING APPARATUS, IMAGE FORMING METHOD, AND NON-TRANSITORY COMPUTER READABLE MEDIUM THAT GENERATE A LIST OF USERS WAITING FOR A JOB EXECUTION

CROSS-REFERENCE TO RELATED APPLICATIONS

This application is based on and claims priority under 35 USC 119 from Japanese Patent Application No. 2015-104363 filed May 22, 2015.

BACKGROUND

Technical Field

The present invention relates to an image forming apparatus, an information processing apparatus, an image forming method, and a non-transitory computer readable medium.

SUMMARY

According to an aspect of the invention, there is provided an image forming apparatus. The image forming apparatus includes a generating unit that generates a list of sequence of one or more users who wait for an execution of a job by the image forming apparatus or an operation of the image forming apparatus, and an output unit that outputs information of the list to a terminal apparatus of a user.

BRIEF DESCRIPTION OF THE DRAWINGS

Exemplary embodiments of the present invention will be described in detail based on the following figures, wherein.

DETAILED DESCRIPTION

Exemplary embodiments of the present invention are described with reference to the drawings.

Figure 1:
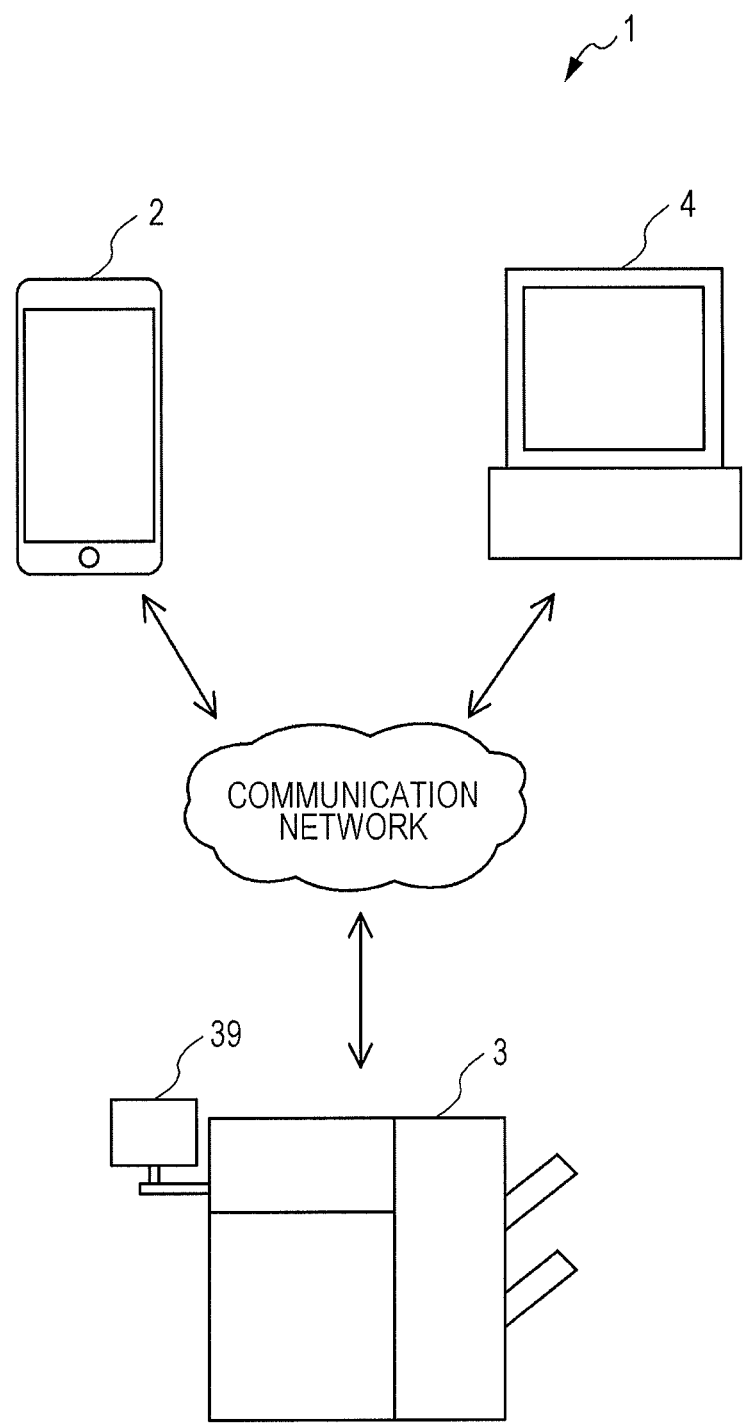
FIG. 1 illustrates a configuration of an image forming system.

FIG. 1 illustrates a configuration of an image forming system 1. The image forming system 1 includes a terminal apparatus 2, an image forming apparatus 3, and a personal computer (PC) 4. The terminal apparatus 2, the image forming apparatus 3, and the PC 4 are connected to a communication network and communicate data with each other.

Figure 2:
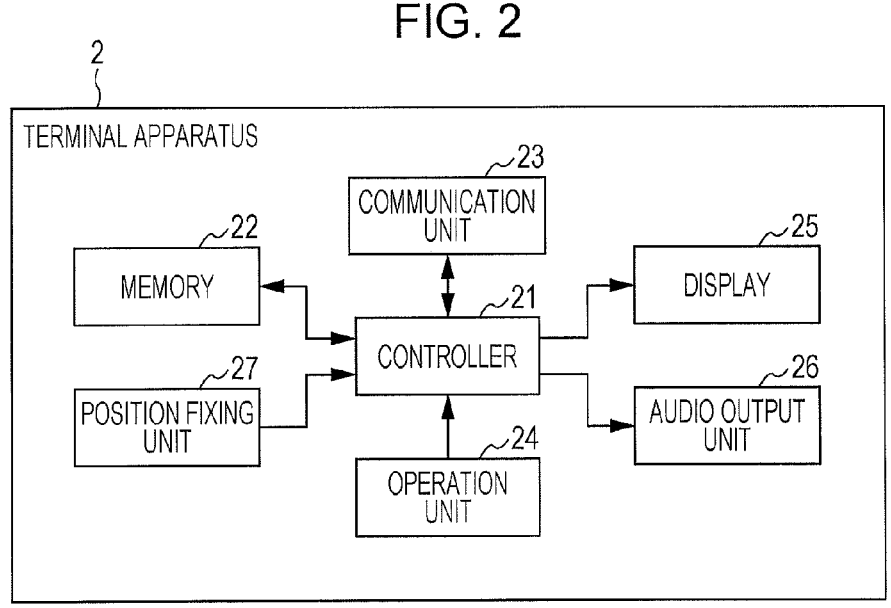
FIG. 2 is a block diagram illustrating a configuration of a terminal apparatus.

FIG. 2 is a block diagram illustrating a configuration of the terminal apparatus 2. The terminal apparatus 2 is implemented by a smart phone or tablet PC. In the discussion that follows, the terminal apparatus 2 is a smart phone. Referring to FIG. 2, the terminal apparatus 2 includes a controller 21, a memory 22, a communication unit 23, an operation unit 24, a display 25, an audio output unit 26, and a position fixing unit 27.

The controller 21 is a computer including a central processing unit (CPU), and performs information processing in accordance with an operating system and other programs. The memory 22 includes a random-access memory (RAM) and an auxiliary memory portion, such as a solid-state drive (SSD). The communication unit 23 exchanges data with another apparatus via the communication network.

The programs and data are supplied to the terminal apparatus 2 from a remote location via the communication network. The programs and data stored on a memory card as an example of an information storage medium may be read and stored on the memory 22.

The operation unit 24 may be a pointing device that indicates to a user a location on a screen displayed on the display 25. The operation unit 24 may be a touch panel overlaid on the display 25.

The display 25 is a liquid-crystal display or an organic electroluminescent (EL) display, and displays a variety of screens. The audio output unit 26 is a loudspeaker or a headphone, and outputs audio data.

The position fixing unit 27 is a sensor that fixes the present position of the terminal apparatus 2. For example, the position fixing unit 27 is a global positioning system (GPS) sensor that acquires position fixing information from the GPS system.

Figure 3:
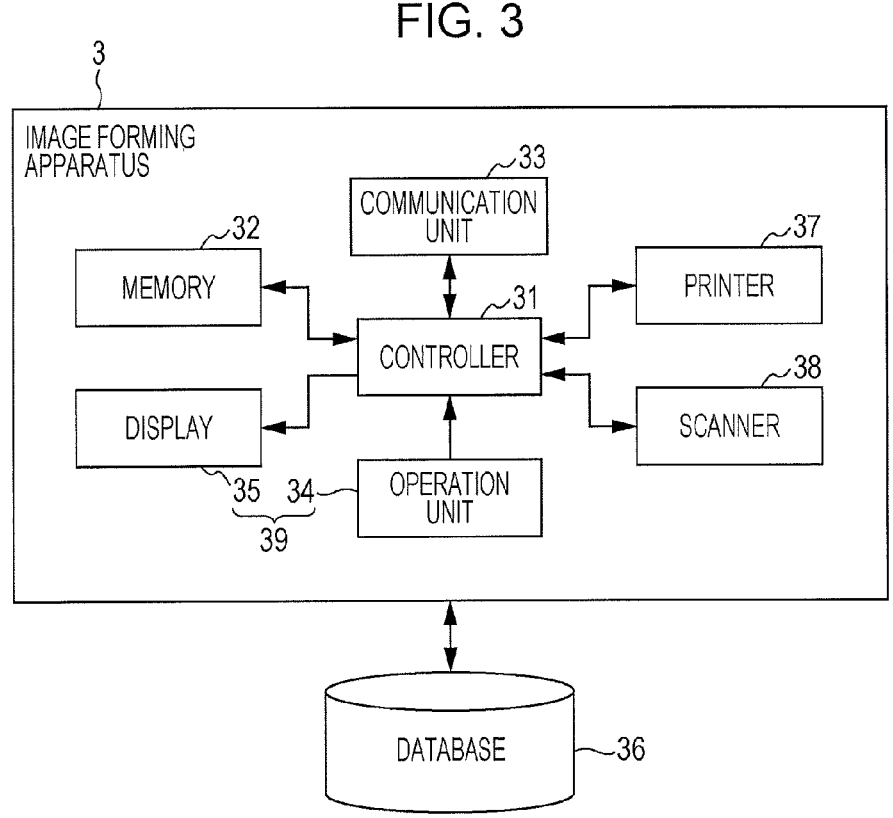
FIG. 3 is a block diagram illustrating a configuration of an image forming apparatus.

FIG. 3 is a block diagram illustrating a configuration of an image forming apparatus 3. The image forming apparatus 3 includes a controller 31, a memory 32, a communication unit 33, an operation unit 34, a display 35, a database 36, a printer 37, and a scanner 38.

From among these elements, the controller 31, the memory 32, the communication unit 33, the operation unit 34, and the display 35 are respectively similar to the controller 21, the memory 22, the communication unit 23, the operation unit 24, and the display 25 in the terminal apparatus 2. The operation unit 34 and the display 35 form an operation panel 39.

The image forming apparatus 3 may gain access to a database 36. The database 36 may be arranged in the image forming apparatus 3 or in a server computer different from the image forming apparatus 3.

The image forming apparatus 3 includes a printer 37 configured to form an image on a paper sheet as a recording medium, and a scanner 38 configured to read an image from a paper sheet medium. The image forming apparatus 3 may thus perform a print job, a scan job, and a facsimile job. The print job is an image forming job that is performed by the printer 37, and the scan job and the facsimile job are non-image forming job that is performed without using the printer 37.

When a user transmits a print job to the image forming apparatus 3 using a printer driver in the PC 4 in the image forming system 1, the image forming apparatus 3 issues a reservation number for the print job, and then transmits the reservation number to the terminal apparatus 2. When a user's turn to execute the print job has come, the image forming apparatus 3 transmits to the terminal apparatus 2 of the user a notification prompting the user to perform an operation to execute the job. Upon receiving the notification, the user approaches the image forming apparatus 3, and operates the operation panel 39. The operation panel 39 performs a user authentication process, and instructs the print job to be performed.

Optionally, the operation of the image forming apparatus 3 may be performed by an information processing apparatus, such as a server computer different from the image forming apparatus 3.

Figures 4, 5:
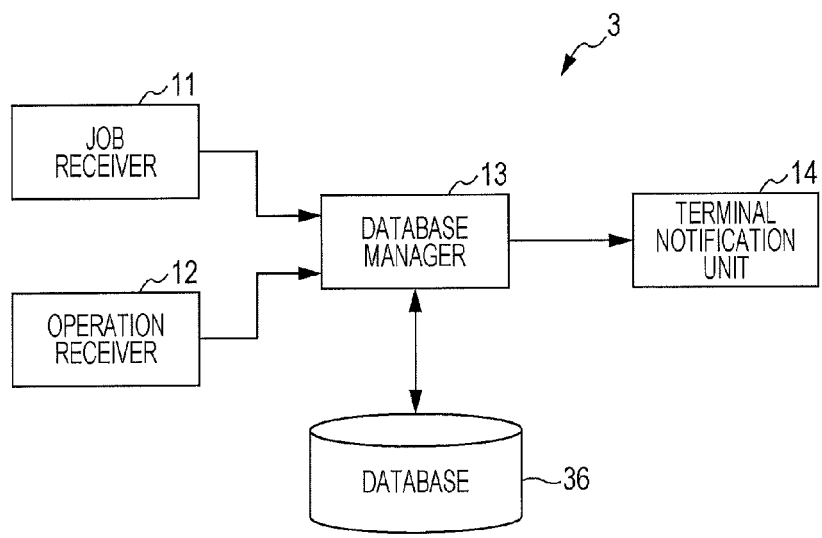
FIG. 4 illustrates contents of a queuing list.
FIG. 5 is a block diagram illustrating a configuration of the image forming apparatus.

FIG. 4 illustrates contents of a queuing list. The queuing list indicates an execution sequence of jobs, such as print jobs, waiting for execution. The queuing list also displays the sequence of jobs, such as print jobs, to be performed by the image forming apparatus 3 or the sequence of one or more users who waits for an operation on the image forming apparatus 3. Referring to FIG. 4, the queuing list includes fields of an "execution sequence", a "job ID", a "user ID", a "reservation number", a "reception time", "expected time period for execution", and "expected time of completion".

The "execution sequence" indicates the sequence of the jobs according to which the jobs are to be executed. The execution sequence is updated each time a job is complete. More specifically, when one job is complete, that job is deleted from the queuing list, and the remaining jobs advance by one job in the execution sequence.

The "job ID" is identification information identifying each job. The "user ID" is identification information identifying a user who has requested the job to be performed.

The "reservation number" basically indicates the execution order of each job like the "execution sequence". However, the "reservation number" is different from the "execution sequence" in that the reservation numbers are serial numbers assigned to all received jobs, and are respectively unique to the jobs. The reservation number is not updated each time one job is complete. The reservation number may be different from the real execution number because of sequence swapping or an occurrence of an insertion, which will be described below.

The "reception time" indicates the time the image forming apparatus 3 receives the corresponding job. The "time period for execution" indicates a length of time expected to complete the job on the image forming apparatus 3. The "time period for execution" may be calculated based on the image forming page count requested in a print job and image forming throughput of the image forming apparatus 3.

The "expected time of completion" indicates the time the image forming apparatus 3 is expected to complete the job. For example, the "expected time of completion" may be calculated by adding the expected time period for execution to the expected time of completion of the immediately preceding job.

FIG. 5 is a block diagram illustrating a configuration of the image forming apparatus 3. FIG. 5 illustrates blocks related to the queuing in the queuing list from among the functions implemented by the image forming apparatus 3.

The image forming apparatus 3 includes a job receiver 11, an operation receiver 12, a database manager 13, and a terminal notification unit 14. These elements are implemented when the controller 31 executes the program. The database manager 13 is an example of a generating unit and a swapping unit. The terminal notification unit 14 is an example of an output unit and a notification unit.

The job receiver 11 receives a print job from the PC 4, for example, and transfers the print job to the database manager 13. For example, the printer driver of the PC 4 generates a print job, and transmits the print job to the image forming apparatus 3. Alternatively, the terminal apparatus 2 may transmit the print job to the image forming apparatus 3.

The operation receiver 12 receives an operation performed on the operation panel 39 by the user. For example, the operation receiver 12 may receive user authentication responsive to the operation of the user, and an instruction of an execution of a print job. The operation receiver 12 may also receive an insertion to the print job in response to an operation of the user, and transfers the insertion to the database manager 13.

The operation receiver 12 receives a scan job or a facsimile job responsive to an operation of the user, and transfers the scan job or the facsimile job to the database manager 13. Alternatively, the scan job or the facsimile job may be transmitted from the PC 4 or the terminal apparatus 2.

The database manager 13 manages the received print job or other jobs using the database 36. For example, the database manager 13 manages the queuing of the print jobs or the like using the queuing list stored on the database 36. More specifically, the database manager 13 performs operations including "issuing the reservation number", "notifying the upcoming turn", "swapping the jobs in the execution sequence", and "receiving the insertion", which will be described below.

In the operation of issuing the reservation number, the database manager 13 generates an entry of a job at the end of the queuing list upon receiving the job from the job receiver 11 or the operation receiver 12. The database manager 13 transfers to the terminal notification unit 14 the entry of the job together with the user ID to notify the user of the reservation number issued for each job.

In the operation of notifying the upcoming turn, the database manager 13 transfers to the terminal notification unit 14 the user ID to notify the user of the upcoming job whose turn is coming. More specifically, the database manager 13 causes the terminal notification unit 14 to notify the upcoming turn prior to the expected time of completion of the job currently in progress.

In the operation of swapping the jobs in the execution sequence, the database manager 13 swaps the jobs in the execution sequence according to a predetermined condition. The database manager 13 transfers the user IDs to the terminal notification unit 14 in order to notify one or both of the users whose jobs are swapped in the execution sequence of the performed swapping.

In the operation of receiving the insertion, the database manager 13 places a new job as an insertion prior to the job waiting for execution if the user instructs the new job to be executed by operating the operation panel 39. The database manager 13 transfers the user ID to the terminal notification unit 14 to request a user having a job in the queue list to allow the insertion.

The terminal notification unit 14 notifies the terminal apparatus 2 of the user of the insertion request using the user ID received from the database manager 13. The database 36 stores an address list (not illustrated) that associates the user ID with the address of the terminal apparatus 2. The terminal notification unit 14 reads the address of the terminal apparatus 2 in accordance with the received user ID.

Each of the operations of "issuing the reservation number", "notifying the upcoming turn", "swapping the jobs in the execution sequence", and "receiving the insertion" is described below. In the discussion that follows, the print job is described. The operation is true of the scan job and the facsimile job.

Figure 6:
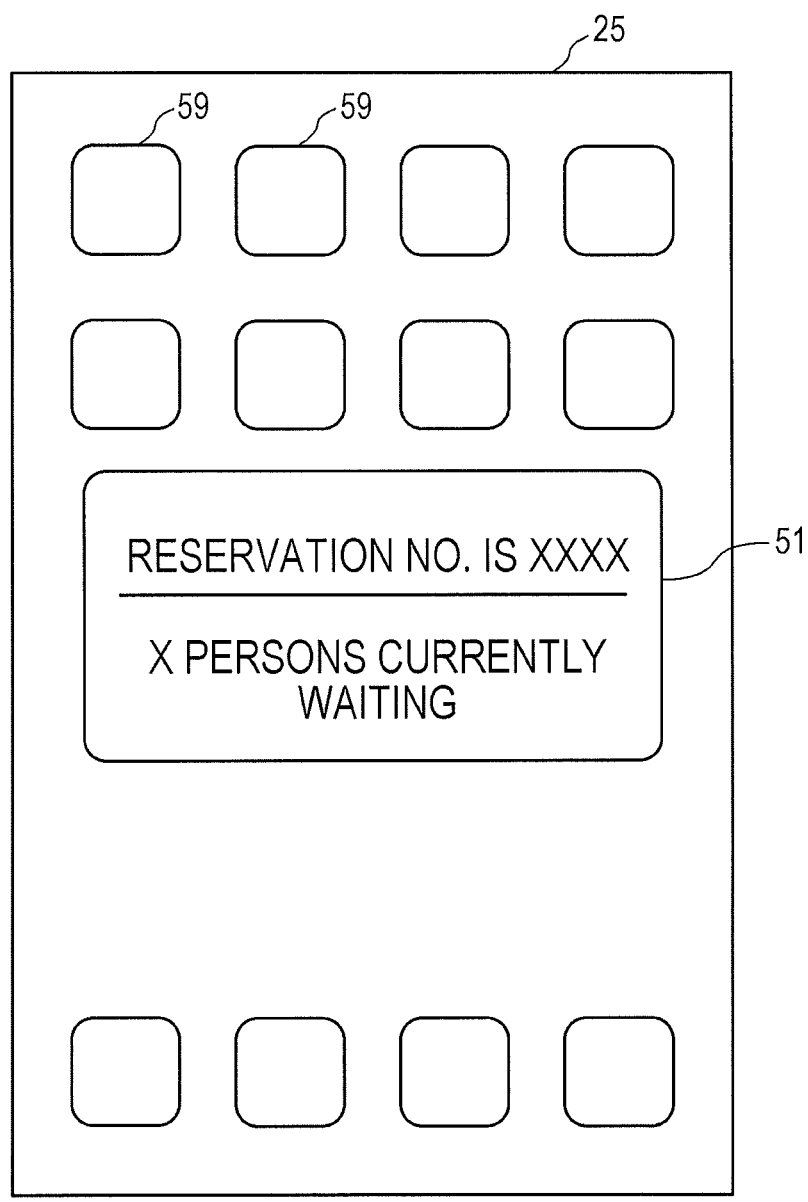
FIG. 6 illustrates a display example of a notification screen.

FIG. 6 illustrates a display example of a notification screen displayed on the terminal apparatus 2 when the reservation number is issued. When the user transmits a print job to the image forming apparatus 3 using the PC 4 or the like, the image forming apparatus 3 notifies the terminal apparatus 2 of the reservation number and the terminal apparatus 2 displays a notification screen 51 of the reservation number on a home display screen, for example.

The notification screen 51 displays a reservation number notified by the image forming apparatus 3. The reservation number indicates the sequence at which the print job transmitted to the image forming apparatus 3 is to be carried out.

The notification screen 51 also displays the number of print jobs currently waiting (the number of waiting jobs) together with the reservation number. Referring to FIG. 6, the number of waiting jobs is indicated as the number of waiting persons. The number of waiting jobs correspond to a value in the "execution sequence" of the queuing list, and represents the sequence of the print job transmitted to the image forming apparatus 3.

Since the reservation number and the number of waiting jobs are notified to the terminal apparatus 2, the user may easily estimate how long the waiting time is. By notifying the reservation number in particular, the user may estimate how long the waiting time is while referring to the reservation number as a number identifying the print job.

The notification screen 51 displaying the reservation number may display a reservation number whose operation is currently in progress instead of or together with the number of waiting jobs. The user may easily estimate the waiting time by referring to the reservation number of the print job transmitted by the user and the reservation number of the job currently in progress.

Figure 7A:
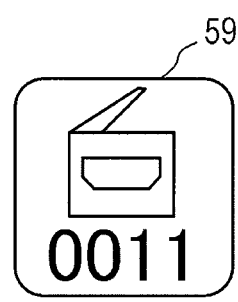
FIG. 7A and FIG. 7B illustrate display examples of icon images.
Figure 7B:
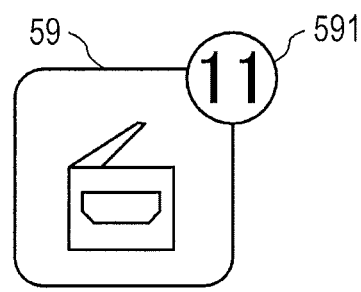

The display method is not limited to the screen of FIG. 6. For example, the reservation number may be displayed on an icon image 59 as illustrated in FIG. 7A and FIG. 7B. The reservation number is displayed by a widget engine. The widget engine is a relatively small-scale application that operates through an icon image displayed on the home screen.

Referring to FIG. 7A, multiple icon images 59 with a number attached thereto are prepared, and one of these images is selected by the widget engine, and is displayed. Referring to FIG. 7B, a number image 591 attached to the icon image 59 may be switched by the widget engine.

The color tone of the icon image 59 with the reservation number may be set to be different from the color tone of an icon image 59 in a normal state to indicate that the first icon image 59 is in a reserved status. The icon 59 displayed in response to the notification of the upcoming turn, the notification of the swapping, or the insertion request may be set to be different from the icon image 59 in a normal state.

Figure 8:
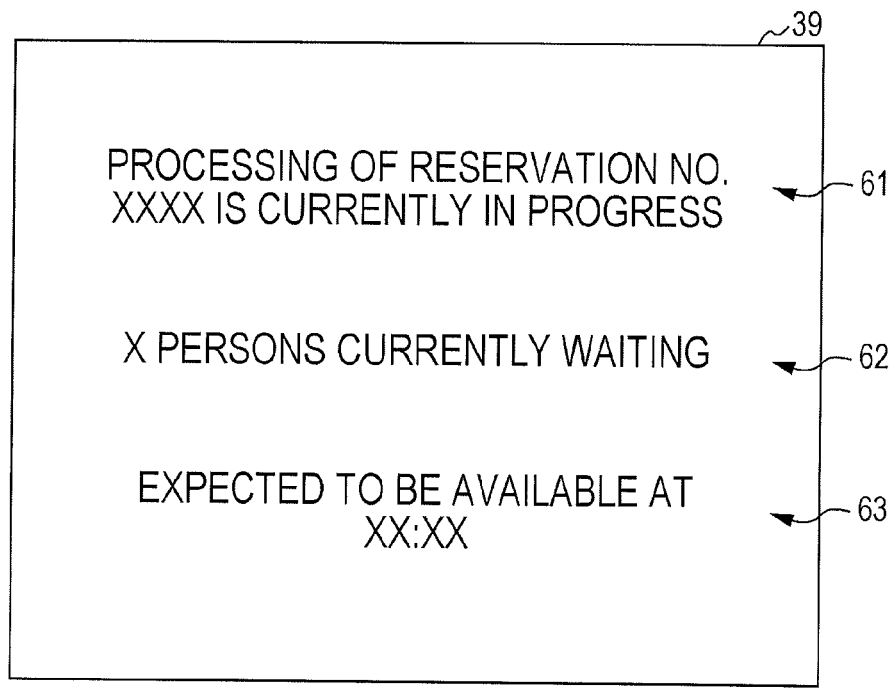
FIG. 8 illustrates a display example of a notification screen.

FIG. 8 illustrates a display example of a notification screen on the image forming apparatus 3. The operation panel 39 or the like in the image forming apparatus 3 displays a message 61 indicating the reservation number of the print job currently in progress, a message 62 indicating the number of currently waiting print jobs (the number of waiting jobs), and a message 63 representing the expected time of completion of the currently waiting print job. Optionally, a dedicated display to display the messages 61 through 63 may be arranged in the image forming apparatus 3.

When the message 61 indicating the reservation number of the print job currently in progress is displayed, the user may easily estimate how long the user is going to wait based on the relationship between the reservation number of the print job currently in progress and the reservation number of the print job the user has transmitted. Since the message 62 indicating the number of currently waiting print jobs (the number of waiting jobs), and the message 63 representing the expected time of completion of the currently waiting print job are displayed, a user who is going to reserve the image forming apparatus 3 may easily estimate how long he or she is going to have to wait.

Figure 9:
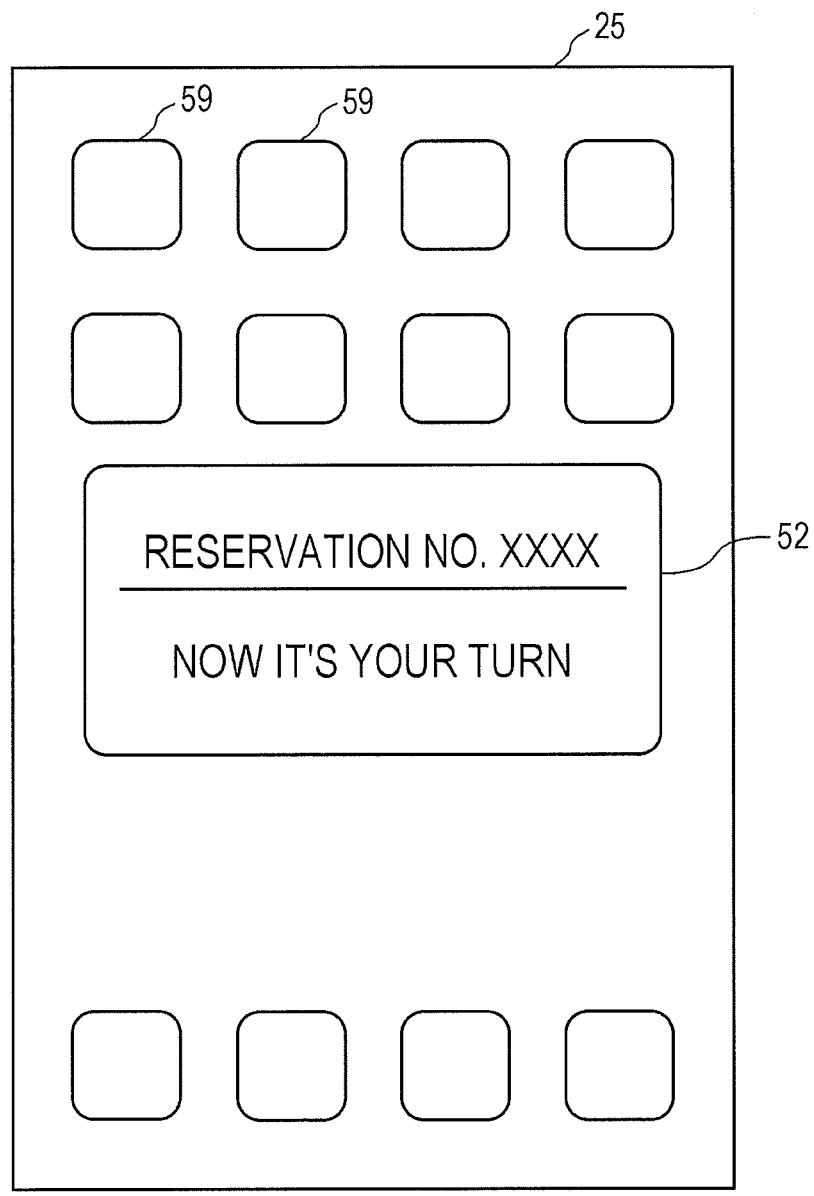
FIG. 9 illustrates a display example of the notification screen.

FIG. 9 illustrates a display example of the notification screen displayed on the terminal apparatus 2 when the upcoming turn is notified. The image forming apparatus 3 notifies the upcoming turn to the terminal apparatus 2 of the user of the print job whose job turn is coming. The terminal apparatus 2 displays a notification screen 52 of the upcoming turn on the screen, such as the home screen.

The notification screen 52 of the upcoming turn displays a message conveying that the job turn of the print job of the user has come. In this way, the user is prompted to perform an operation to execute the print job. For example, the user may approach the image forming apparatus 3, and operate the operation panel 39 for user authentication, and instruct the image forming apparatus 3 to perform the print job. The print job thus starts.

The image forming apparatus 3 notifies the terminal apparatus 2 of the user of the upcoming turn prior to the expected time of completion of the print job currently in progress. The image forming apparatus 3 thus prompts the user to perform an operation to execute the print job, thereby reducing a time period between the end of the print job currently in progress and the start of the next print job.

If the operation to execute the print job is not performed after a specific time period has elapsed since the notification of the upcoming turn to the terminal apparatus 2, the image forming apparatus 3 skips the print job whose job turn has come. In this way, an idling time period not executing the print jobs is reduced.

Figure 10:
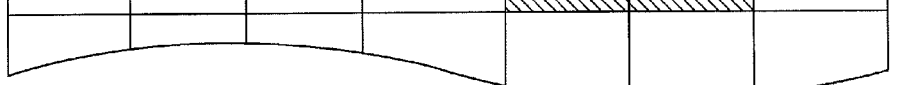
FIG. 10 illustrates swapping of jobs in a job sequence.

FIG. 10 illustrates swapping of jobs in the job sequence. The image forming apparatus 3 swaps the print jobs in the execution sequence in accordance with a predetermined condition. For example, the image forming apparatus 3 compares the expected time period for execution of a print job newly added in the queuing list with the expected time period for execution of an immediately preceding print job to determine whether to swap the print jobs in the execution sequence.

More specifically, if a difference between the expected time period for execution of the immediately preceding print job and the expected time period for execution of the added print job is longer than a predetermined time period, the image forming apparatus 3 swaps the newly added print job for the immediately preceding print job in the execution sequence. This arrangement alleviates the user's feeling of waiting for the newly added print job. On the other hand, the user of the immediately preceding print job does not feel a much difference in terms of the time of completion of the print job.

If a difference between the reception time of the immediately preceding print job and the reception time of the newly added print job is shorter than a predetermined time period, the image forming apparatus 3 may swap the newly added print job for the immediately preceding print job in the execution sequence. This arrangement limits the target of swapping to the print job newly added in a relatively short time range, thereby relieving more the user of the immediately preceding print job of a sense of unfairness.

Figure 11:
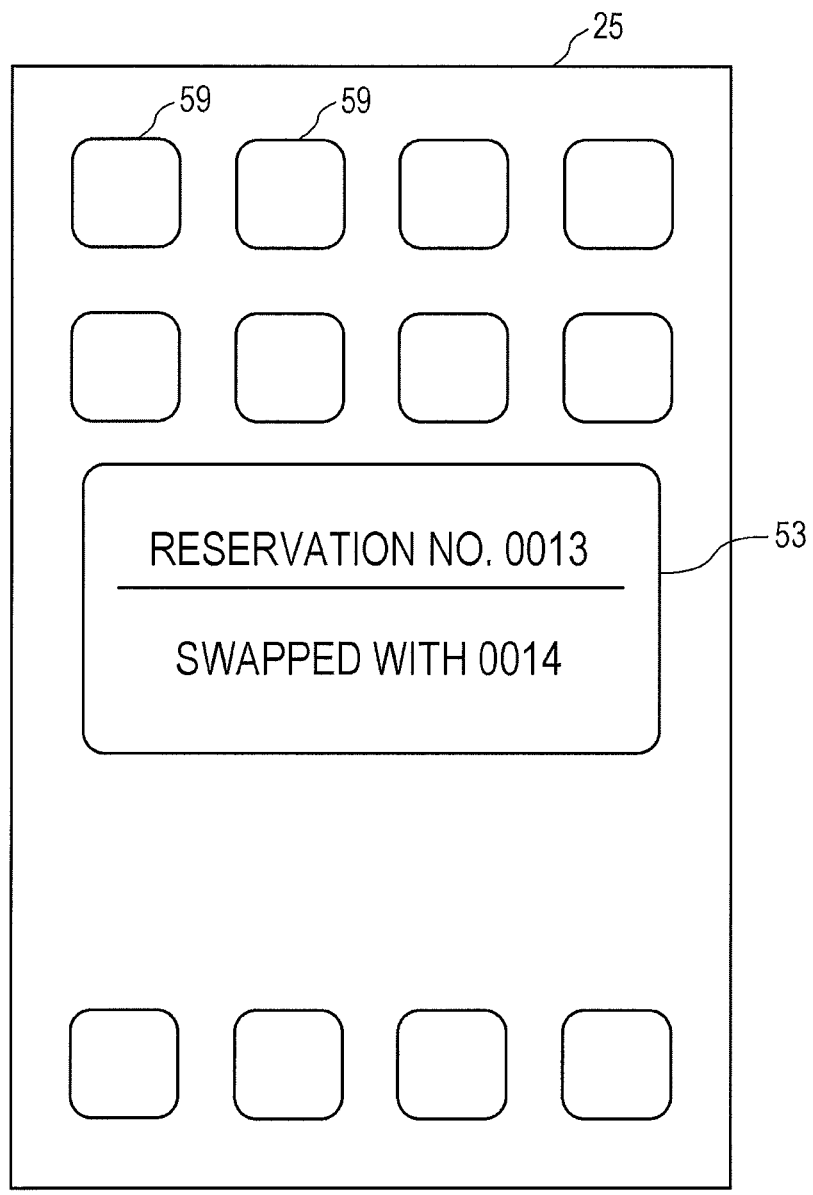
FIG. 11 illustrates a display example of the notification screen.

FIG. 11 illustrates a display example of the notification screen displayed on the terminal apparatus 2 when the print jobs are swapped in the execution sequence. When the two print jobs are swapped in the execution sequence, the image forming apparatus 3 notifies the terminal apparatuses 2 of the users of the two swapped print jobs. The terminal apparatuses 2 then display a notification screen 53 regarding the swapping on the screen on the home screen. It is acceptable that the notification of the swapping is performed to the terminal apparatus 2 of the user of one print job alone.

The notification screen 53 regarding the swapping displays a message indicating the print jobs of the users are swapped. In this way, the user may learn the swapping in the execution sequence. Since the message describes the reservation number of the other print job, the user may recognize based on the magnitude relation of the reservation numbers whether the user's own print job is advanced or delayed in the execution sequence.

The swapping of the print jobs in the execution sequence is not limited to the method described above. The swapping may be performed in a variety of methods. For example, the users may be ranked and a print job of a relatively higher ranking user is set to have a higher priority than a print job of a relatively lower ranking user.

Figure 12:
FIG. 12 illustrates an example of an insertion.

FIG. 12 illustrates an example of an insertion of a print job responsive to an operation of the operation panel 39. For example, the image forming apparatus 3 may operate in an "insertion enabled mode" that normally accepts an insertion of a print job in response to an operation of the operation panel 39, or in an "insertion enquiry mode" that asks the user of the waiting print job whether to allow an insertion when the operation panel 39 is operated to give an instruction to insert the print job.

If the insertion is allowed in the "insertion enabled mode" or the "insertion enquiry mode", the image forming apparatus 3 generates at the top of the queuing list an entry of a new print job the user has instructed by operating the operation panel 39, and moves each of the waiting print jobs down in the execution sequence by one entry.

Figure 13:
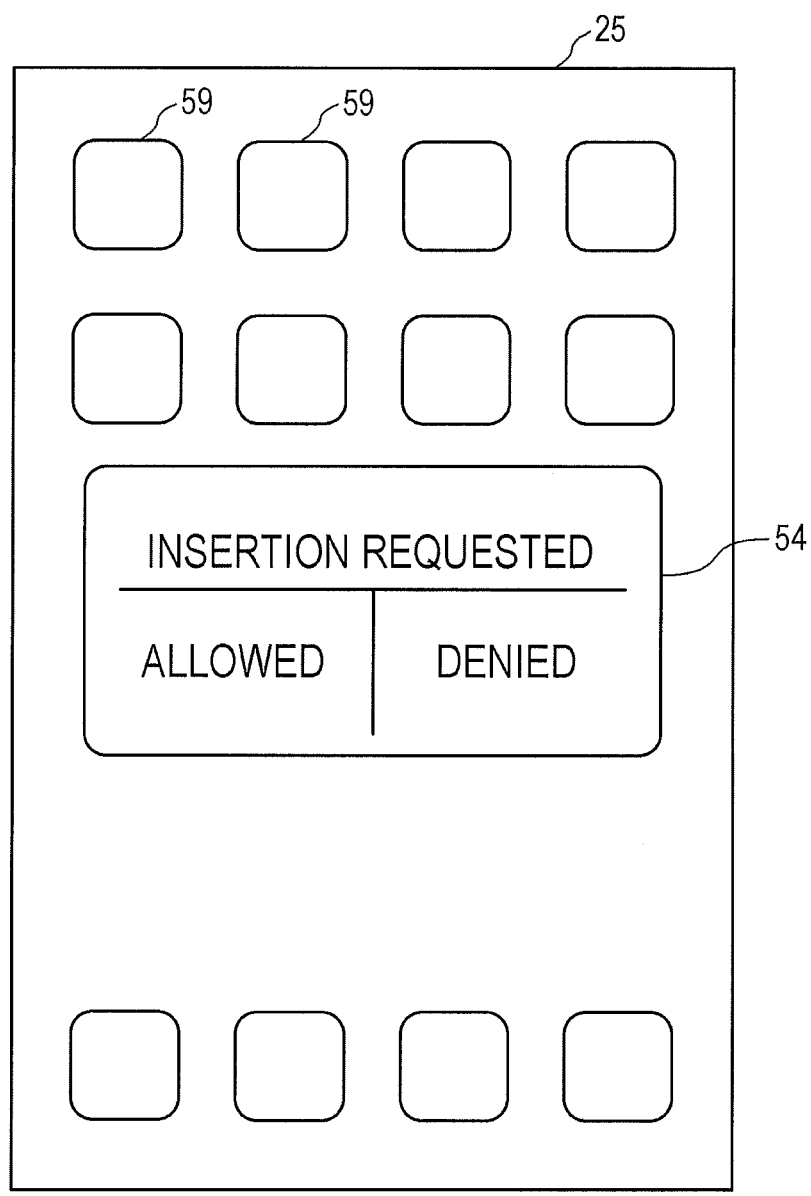
FIG. 13 illustrates a display example of the notification screen.

FIG. 13 illustrates a display example of the notification screen displayed on the terminal apparatus 2 to ask whether the insertion is allowed or not. If a user operates the operation panel 39 to allow an insertion of a print job in the "insertion enquiry mode", the image forming apparatus 3 asks the terminal apparatus 2 of another user of the waiting print job whether the insertion is to be allowed or not. The terminal apparatus 2 displays an enquiry notification screen 54 on the home screen. The enquiry as to whether the insertion is allowed or not is made to the users of all waiting print jobs.

The enquiry notification screen 54 displays a selection box to select between allowing or denying the insertion together with a message representing an insertion request. If the insertion is allowed, the terminal apparatus 2 returns an insertion allowance to the image forming apparatus 3. If the insertion is denied, the terminal apparatus 2 returns an insertion denial to the image forming apparatus 3. The image forming apparatus 3 allows no insertion of a new print job.

Even while the print job is waiting, the image forming apparatus 3 may perform a scan job or a facsimile job because the scan job and the facsimile job are non-image forming jobs that do not use the printer 37. When the scan job or the facsimile job is performed with the user operating the operation panel 39, the image forming apparatus 3 may execute the scan job or the facsimile job regardless of whether the print job is waiting or not.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:
a processor that acts as:
a generating unit that generates a list of sequence of one or more users who wait for an execution of a job by the image forming apparatus or an operation of the image forming apparatus;
an output unit that outputs information of the list to a terminal apparatus of a user; and
a swapping unit that swaps a job of interest for a job immediately subsequent to the job of interest in an execution sequence if a difference between expected time period for execution of the job of interest and expected time period for execution of the immediately subsequent job is longer than a predetermined time period and a difference between reception time of the job of interest and reception time of the immediately subsequent job is shorter than a predetermined time period.

2. The image forming apparatus according to claim 1, wherein the processor further acts as a notification unit that notifies the terminal apparatus that the user's turn is upcoming,
wherein the job is executed if the user's turn has come and an operation of the user has instructed the job to be executed.

3. The image forming apparatus according to claim 2, wherein the processor acting as the notification unit notifies the terminal apparatus of the upcoming user's turn before an execution of an immediately preceding job is complete.

4. The image forming apparatus according to claim 2, wherein the user's turn is swapped for a next user's turn if the user fails to instruct the job to be executed before a predetermined time period has elapsed since the notification to the terminal apparatus.

5. The image forming apparatus according to claim 1, further comprising a display that displays a job number of a job currently in progress, a number of jobs waiting for job execution, or an expected time of completion of each job.

6. The image forming apparatus according to claim 4, wherein the processor further acts as a notification unit that notifies each of the terminal apparatuses of the two users having the jobs thereof swapped in an execution sequence that the jobs are swapped in the execution sequence.

7. The image forming apparatus according to claim 1, wherein if the user instructs a new job to be executed by operating the processor acting as an operation unit in the image forming apparatus, the new job is executed prior to the job having waited for execution.

8. The image forming apparatus according to claim 1, wherein the processor further acts as an output unit that outputs to the terminal apparatus of a first user waiting for a job to be executed an enquiry as to whether execution of a new image forming job is allowed or not prior to the first user's job if a second user instructs the image forming apparatus to perform the new image forming job by operating the processor acting as an operation unit in the image forming apparatus, wherein the new image forming job is not executed if the terminal apparatus responds with a denial reply.

9. An image forming apparatus, comprising:
a processor that acts as:
a generating unit that generates a list of sequence of one or more users who wait for an execution of a job by the image forming apparatus or an operation of the image forming apparatus; and
an output unit that outputs information of the list to a terminal apparatus of a user,
wherein if the user instructs a new job free from image forming by operating the processor acting as an operation unit in the image forming apparatus, the new job is executed regardless of the presence or absence of a job waiting for execution.

10. An information processing apparatus, comprising:
a processor that acts as:
a generating unit that generates a list of sequence of one or more users who wait for an execution of a job by an image forming apparatus or an operation of the image forming apparatus;
an output unit that outputs information of the list to a terminal apparatus of a user; and
a swapping unit that swaps a job of interest for a job immediately subsequent to the job of interest in an execution sequence if a difference between expected time period for execution of the job of interest and expected time period for execution of the immediately time of the job of interest and reception time of the immediately subsequent job is shorter than a predetermined time period.

11. An image forming method of an image forming apparatus, comprising:
generating a list of sequence of one or more users who wait for an execution of a job by the image forming apparatus or an operation of the image forming apparatus;
outputting information of the list to a terminal apparatus of a user; and
swapping a job of interest for a job immediately subsequent to the job of interest in an execution sequence if a difference, between expected time period for execution of the job of interest and expected time period for execution of the immediately subsequent job is long than a predetermined time period and a difference between reception time of the job of interest and reception time of the immediately subsequent job is shorter than a predetermined time period.

12. A non-transitory computer readable medium storing a program causing a computer to execute a process for forming an image, the process comprising:
generating a list of sequence of one or more users who wait for an execution of a job by the image forming apparatus or an operation of the image forming apparatus;
outputting information of the list to a terminal apparatus of a user; and
swapping a job of interest for a job immediately subsequent to the job of interest in an execution sequence if a difference between expected time period for execution of the job of interest and expected time period for execution of the immediately subsequent job is longer than a predetermined time period and a difference between reception time of the job of interest and reception time of the immediately subsequent job is shorter than a predetermined time period.

\* \* \* \* \*